Nov. 26, 1940. R. A. BLISH ET AL 2,222,601
DRINK MIXER
Filed Feb. 18, 1937 2 Sheets-Sheet 1
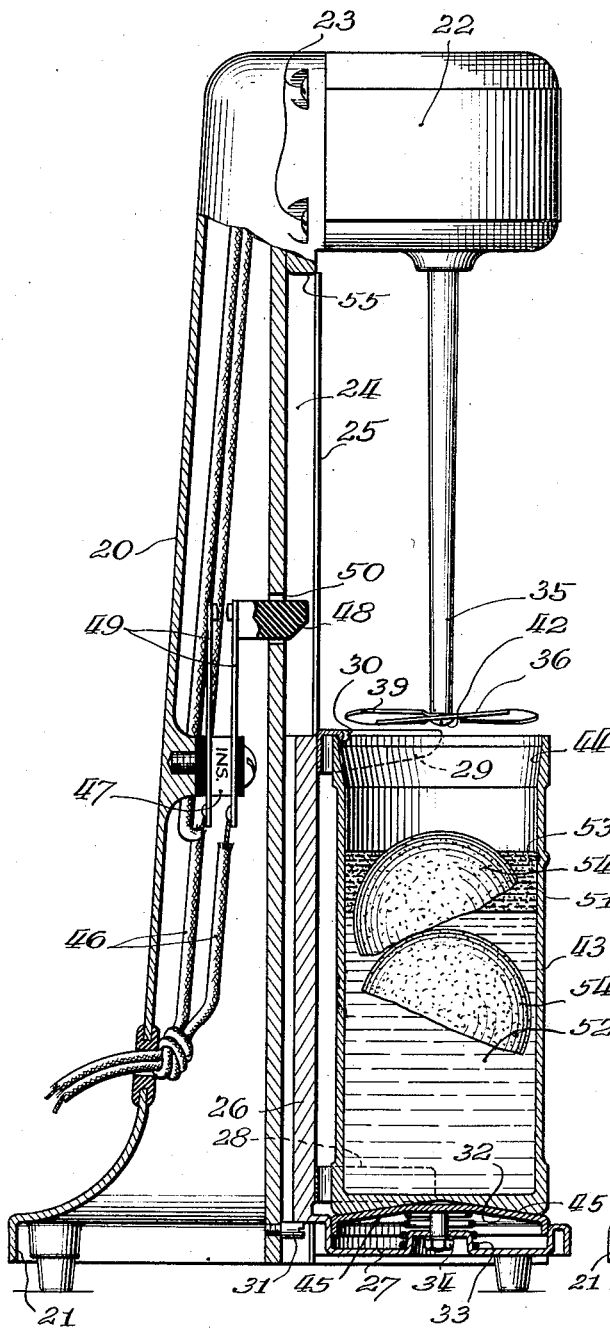
INVENTORS,
RUSSELL A. BLISH, DECEASED,
BY LOUIS D. JONES, ADMX.,
HARRY D. RENCH.

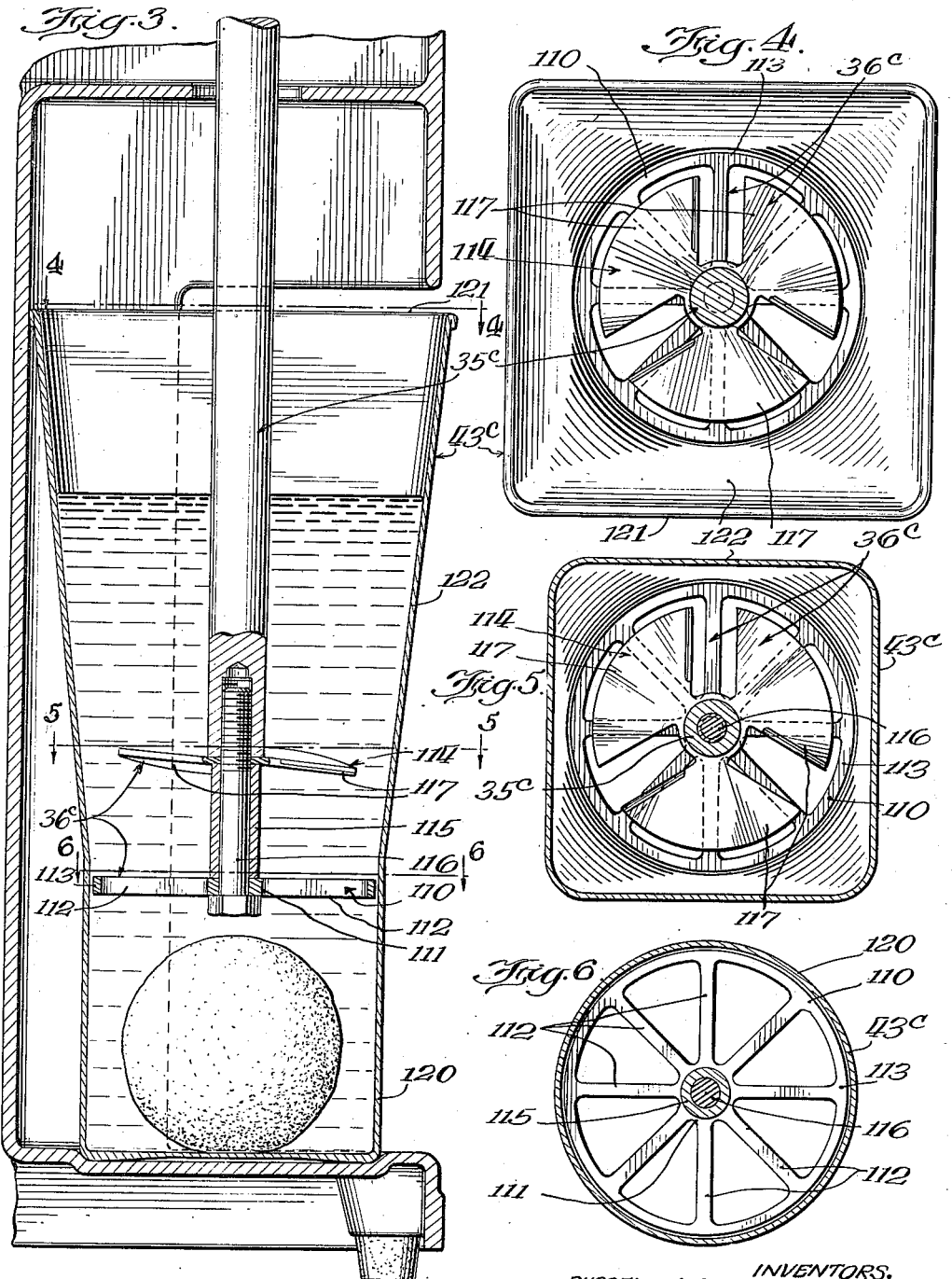

Patented Nov. 26, 1940

2,222,601

UNITED STATES PATENT OFFICE 2,222,601

DRINK MIXER

Russell A. Blish, deceased, late of Racine, Wis., by Louis D. Jones, administrator, Kenilworth, Ill., and Harry D. Rench, Racine, Wis.

Application February 18, 1937, Serial No. 126,430

4 Claims. (Cl. 259—108)

This invention relates to drink mixers and in many of its aspects it relates especially to malted milk beverage mixers and mixing.

A very palatable and potentially popular form of malted milk preparation is the so-called "frosted malted milk"—a frozen (or more accurately, semi-frozen) malted milk which is about halfway between malted milk ice cream and the conventional wholly liquid malted milk beverage as served at soda fountains. Despite its appeal it has merchandising limitations; it cannot be made to order at soda fountains, but has to be made in an ice cream freezer and stored in the fountain in refrigerated cases, much as ice cream is stored. Also, because of its thickness and the extent to which it is frozen, it is not potable, but has to be eaten with a spoon.

One of the principal objects of this invention is a method of, and apparatus for, mixing a malted milk preparation which retains most of the distinguishing characteristics of this "frosted malted milk" or semi-frozen form of malted milk preparation, but which can easily and quickly be made to order at a soda fountain, using the same ingredients as are customarily used in the conventional malted milk drink—milk, ice cream, malted milk powder and syrup—and which, if desired, is also readily potable. By the present invention this object is realized by quickly de-solidifying all the ice cream and mixing the other ingredients with each other and with the de-solidified ice cream. The ice cream is de-solidified to the exclusion of any sizable pieces, but most of the ice cream is left in unmelted or crystalline form so that it imparts to the drink the desirable characteristic "frosty" or crystalline structure.

Another object of the invention is a much shorter mixing period, thereby minimizing the attendant's time and the waiting period for the customer. One advantage in minimizing the time of the mixing period is the elimination of the tendency of the attendant to busy himself with something else during the mixing period, with the frequent result that the mixing is permitted to continue too long, so that the working of the ingredients not only melts all of the ice cream, but heats up the beverage considerably above its desirable low temperature.

Another object, directed to the latter advantage, is the requirement that the operator remain at the mixing apparatus during the actual mixing and agitating period, thereby further minimizing the danger of the malted milk being heated by excessive working.

A further object is greater convenience and speed in the placement of the cup and the entrance and withdrawal of the agitator.

A still further object of the invention is a de-solidifier for ice cream which reduces it to a non-solid but still crystalline form whether or not the ice cream is to be thereby mixed with other ingredients. Thus a frozen malted milk preparation in the nature of ice cream, but lighter bodied and not so hard, can be de-solidified to a more palatable consistency, or even to a potable but yet frosty consistency, by the device of this invention. To freeze the original mix for such a preparation only to such a consistency and to store it ready-to-serve at that consistency would not be feasible because it involves maintaining it at too delicate a critical temperature.

The de-solidifying of ice cream is not confined to malted milk preparations, however. Ice cream sherbert, orange ice, or the like, may be desolidified and consumed as such. Or, it may be simultaneously mixed with flavoring syrups, fruits, etc. It may be de-solidified along with bananas, peaches or other fresh or preserved fruits, the action of the device also de-solidifying the fruit.

The invention also has for an object the preservation of aeration of the beverage, comparable with that produced by the conventional malted milk mixer, despite the fact that the device must at the same time be so constructed that it will quickly desolidify the ice cream without melting it.

The foregoing together with further objects, features and advantages of the invention are set forth in the following description of specific embodiments thereof, which are illustrated in the accompanying drawings wherein:

Fig. 1 is a side elevation partly in medial vertical section of the first form of the invention;

Fig. 2 is a front elevation thereof but showing the cup and its carriage in elevated position;

Fig. 3 is a vertical section through a cup and agitator, and

Figs. 4, 5 and 6 are plan sections taken on the lines 4/4, 5/5 and 6/6, respectively, of Fig. 3.

Referring to the first form of the invention shown in Figs. 1 and 2, inclusive, the drink mixer is built upon a hollow standard 20 having a base 21. At its upper end the standard 20 presents a flat face for mounting of a vertically journalled motor 22 by means of cap screws 23. Beneath the motor mounting the forward face of the standard 20, which is D-shaped in cross section, presents a vertical way 24 which is completed by side strips 25. In the way 24 a cup carriage 26 is slidably mounted for vertical reciprocation.

At its lower end the carriage 26 includes a platform or bottom 27 coaxial with the motor, a semi-circular lower cup guide 28 a short distance thereabove and also coaxial with the motor, and near its top a semi-circular upper cup guide 29 which has an overhanging hook-like lip 30 at its midportion. A stop pin 31 limits the downward movement of the carriage 26.

The carriage 26 also has a platform portion including a false bottom 32 preferably somewhat convexed on its upper surface and marginally flanged to telescope with the inner marginal flange of the bottom 27. The false bottom 32 is yieldingly urged upwardly by a coil spring 33, being limited by the bolt and nut 34 carried on the underside of the false bottom and passing through an opening in the centrally embossed portion of the bottom 27.

The armature of the motor 22 is extended downwardly as a shaft 35 which carries at its lower end an agitator 36. The agitator 36, in its preferred form, is formed from a disc having a set of four slots each extending radially from a slot head adjacent the center and defining a set of four blades 39. These blades are pitched propeller-wise so that, when the agitator is rotated the agitator tends to feed itself downwardly and upwardly propel the medium in which it rotates. The leading edge of each blade 39 is preferably inclined to the vertical, to facilitate the action of the propeller in digging into any material which it encounters and in cutting up the material. The agitator carries a central opening for the passage of the shank of the cap screw 42 by which it is secured to the lower end of the shaft 35.

The cup 43, illustrated in connection with the first form of the invention, is a straight-sided or cylindrical cup except that for a short distance adjacent its upper edge the inside is outwardly flared as indicated at 44. The cup is of only slightly greater diameter than the overall diameter of the agitator 36. The flare 44 permits the lip 30 to overhang the upper edge of the cup and still clear the agitator. As is usual in cups of this type, the bottom and the lower part of the side are externally thickened for greater strength. The bottom surface 45 of the cup is concaved to mate the convexed surface of the false bottom 32, these mating surfaces tending, under the influence of the spring 33, to center the cup upon the axis of the agitator.

One of the electrical conductors 46 leading to the motor is connected in series with a switch 47 mounted on the rear wall of the standard 20 and within the hollow thereof. An insulated button or cam 48 extends forwardly from one of the contact fingers 49 and passes through a slot 50 in the forward face of the standard 20. The cam 48 is so arranged that when the carriage 26 is elevated to the height of the cam, the cam surface will be engaged by the upper rearward corner of the carriage 26 and be depressed backwardly closing the circuit and retaining it closed so long as the backside of the carriage 26 rests against the cam.

The operation of the first form of the invention—the form comprising Figs. 1 and 2, inclusive, just described—is as follows:

While the cup 43 is away from the mixer, the cup is charged with the usual ingredients for a malted milk drink—syrup, 51, milk 52, malted milk powder 53 and one or more balls of ice cream 54. The operator then carries the charged cup to the mixer and pushes it more or less horizontally into position, pressing it down against the resilient false bottom 32 sufficient to permit the lip to catch over the rim of the cup. The upper and lower semi-circular guides 28 and 29 serve to position the cup in axial alignment with the shaft 35 and agitator 36. The lip 30 prevents the forward withdrawal of the upper end of the cup, and the mating concave and convex surfaces of the cup bottom and the false bottom 32 tend to hold the bottom of the cup against forward movement. The spring 33 also holds the upper edge of the cup beneath the hook 30. Then the operator, preferably without releasing his grasp upon the cup, moves the cup upwardly. Because the upper edge of the cup is embraced by the lip 30 of the carriage 26, the carriage is likewise lifted upwardly and thereby the cup is moved under the guidance of the carriage as it moves along its way 24. This keeps the cup in alignment with the agitator. The agitator 36 enters the cup, clearing the lip as previously explained, passes the outwardly flared portion 44 and enters the cylindrical body of the cup. By this time the upper end of the carriage 26 has contacted the cam 48 causing the circuit to be closed and the rotation of the agitator commenced.

With continued upward movement of the cup by the operator's hand, the agitator engages the contents of the cup, agitating and mixing them as the upward movement continues. The agitator may rotate relatively slowly—between 900 and 1200 R. P. M., for example. When the ball of ice cream is engaged by the agitator, the sharp leading edges 40 of the blades will comminute some of the ice cream, but primarily the ball of ice cream will be pushed ahead of the agitator until the bottom of the cup is reached. Then the bottom of the cup will push the ice cream against the agitator and despite the resistance offered, the force of the operator's hand and the propeller-like action of the agitator will cause the agitator to work through the remaining mass of the ice cream thoroughly de-solidifying it by a combined crushing-comminuting-agitating action. The operator continues to push the cup upwardly until the top edge of the carriage 26 contacts a stop 55 at the top of the way 24. When the carriage is in this position, the agitator will be a predetermined but very short distance from the bottom of the cup, one-eighth of an inch for example.

It may suffice if the agitator comes only one-fourth or three-eighths of an inch from the bottom because, if the blades are designed to afford the proper scooping action, they will lift ice cream for some distance off the bottom of the cup. Also the turbulence of the agitator will cause ice cream for some distance below the agitator to be thrown into circulation against the agitator.

Because the agitator comes so close to the bottom of the cup and because there is so little clearance between the wall of the cup and the agitator, and because the slots between the blades of the agitator are so narrow, it is impossible for any large piece of ice cream to escape the agitator without being broken down or finely comminuted by it. The agitator thus serves the three-fold function of thoroughly mixing the milk, powder and syrup, de-solidifying the ice cream, and distributing the ice cream more or less thoroughly throughout the mixture.

As soon as the carriage has reached its maximum height, the operator permits the cup to descend. The return movement of the agitator through the cup further mixes the ingredients and de-solidifies the ice cream, masses of which may have readhered. Any ice cream which may be lodged above the agitator as the cup descends, will be thrown outwardly by centrifugal force and broken down or "worked" in passing the periphery of the agitator. The free space above the liquid level affords a further opportunity for the agitator to free itself by centrifugal force of any ice cream or other material before rotation of the agitator is stopped by the opening of the circuit when the carriage 26 disengages the cam 48.

Although the ice cream is substantially de-solidified by the first passage of the agitator through the cup, some of it may readhere and—unless the ice cream was quite soft at the start—it is desirable for the operator to repeat the operation to the end that the de-solidified (but still "frosty") ice cream will be distributed throughout the mixture in more or less separate and very small crystals. The objective is so to de-solidify the ice cream that it occurs in sufficiently small crystals or crystal groups to avoid objectionable lumps and preferably to be readily potable, but still to retain the major portion of the ice cream unmelted and in its crystalline form to impart the desirable "frosted" taste to the beverage as it is drunk.

It appears that the limited and incidental melted ice cream and the milk or other liquid ingredient form a liquid film around each crystal or group of crystals of the ice cream which tends to prevent their readherence and thereby leave the ice cream effectively de-solidified to the exclusion of objectionable lumps while the preparation is being consumed. Sizable lumps of solid ice cream are objectionable for several reasons: Their physical size make them inconvenient to drink. They prevent an intimate mixing of the syrup and malted milk therewith and consequently an unblended flavor. They look "messy." They take longer to melt in the mouth than does the de-solidified but still frosted or crystalline ice cream. Even if the latter is not swallowed until it has melted in the mouth, the lump (which is still solid, although reduced somewhat in size by peripheral melting in the mouth) is swallowed along with the liquid.

While the operation of the mixer has been described at some length, it must be borne in mind that the operation is extremely rapid in point of time consumed. The application of the cup follows an easy and natural movement of the hand, and the hand is then immediately raised and lowered as fast as the operator can conveniently perform the operation, bearing in mind that the ball of ice cream will offer a certain resistance. The removal of the cup, which is a reversal of its application, is equally natural and rapid.

Despite the axial resistance which may be encountered when the remaining ball of ice cream is crowded by the agitator against the bottom of the cup, there will be no danger of the cup becoming dislodged even though the spring 33 for the false bottom 32 be very light. This is because the upward force is applied directly to the cup by the operator's hand. In this form the upward movement, it will be remembered, is not imparted to the cup through the carriage, and thus this thrust is not borne by the false bottom 32.

The fact that the operator has to lift the cup by hand or it will fall to a non-mixing position, insures that the operator cannot leave the agitator running in the cup while he leaves the mixer. This discourages overworking and overheating of the beverage. The automatic switch prevents rotation of the agitator except when it is well within the cup. This avoids the danger of injury by the large and sharp bladed agitator while it is rotating. It also avoids throwing of the ingredients remaining on the agitator.

By this mixer and method it is possible to make to order very quickly a malted milk beverage of the usual ingredients which is readily potable, free from objectionable lumps of ice cream, "thick" tasting, and possessed of the very desirable "frosted" structure.

In Figs. 3 to 6, inclusive, another form of agitator 36c is shown. In some respects it is a double agitator, although the functions of the upper and lower agitator members are not entirely the same. The lower agitator member 110, which is at the end of the shaft 35c, is wagon wheel shaped. It has a hub 111, spokes 112 and a rim 113—all in the same horizontal plane. The spokes are not pitched, although their lower leading edges, at least, are sharp cornered for better comminuting action upon the ice cream. This lower agitator member 110 preferably is of such size that the lateral clearance between its rim 113 and the wall of the lower portion of the cup precludes substantial by-passing of ice cream around it.

The upper agitator member 114 is mounted on the shaft about an inch above the lower member. They are spaced by a sleeve 115 through which the attaching screw 116 passes. The upper agitator member is similar to the agitator of Fig. 1 in that the blades 117 are pitched and sharpened at their leading edges. But the blades are spaced farther apart, there are only three blades, and the overall diameter is considerably smaller than that of the lower agitator member.

Fig. 3 shows a standard which overhangs the cup and wherein the agitator shaft is moved downwardly into the cup, rather than the cup being moved up by the agitator.

The dual agitator is calculated to function as follows: The lower and wheel-like agitator member crushes the ball of ice cream under axial thrust and, as it rotates, the spokes comminute the ice cream. The lower agitator member, while creating some turbulence, creates far less agitation than would be a propeller-like agitator of the same size. The upper or propeller-like agitator receives the liquid ingredients and also such of the ice cream as has been wholly or partially de-solidified (without destroying its crystalline structure) by the lower agitator member. The upper agitator member functions most importantly in aerating the drink. This is possible because it is nearer the top surface of the contents and its propeller formation enables a rapid and generous entrainment of air. Its relatively small diameter, however, precludes its splashing the contents over the top of the cup.

This dual agitator is calculated to be operated at a higher speed than the other agitators shown—3000 R. P. M., for example. The blades of the upper or propeller-like agitator may be pitched as shown so that it tends to throw the ingredients upwardly, or pitched the other way so that it tends to throw the ingredients down. In the latter instance, there is apparently somewhat better aeration and in the former somewhat faster complete de-solidifying of the ice cream, because any ice cream pieces which pass through the lower agitator member are thrown back toward it by the propeller action of the upper member. The difference, however, is not sufficiently marked but that satisfactory results are secured whichever way the blades are pitched.

In Figs. 2 to 6 another form of cup 43c is shown.

It will be understood that either form of cup may be used with either form of agitator.

For practical reasons it is preferable to hold the cup against rotation and to rotate the agitator as distinguished from holding the agitator against rotation and spinning the cup, although many of the advantages of this invention would be realized by the latter arrangement. The action of the agitator in desolidifying the ice cream is more effective if the agitator is rotated while it is trapping the ice cream at the bottom of the cup and crushing it. If it is being rotated the crushing action is augmented by the comminuting or cutting action of the blades and by the general turbulent agitation imparted to the ice cream. Also if the agitator is rotated during the crushing or mashing action, there is that much more mixing of the other ingredients with each other and with the ice cream as it is desolidified and freed. Nevertheless we contemplate that the initial crushing may be done by the agitator before its rotation is commenced, or while it is rotating only slowly.

Although the action of the mixer is very rapid in point of time consumed in mixing the drink, the motor and agitator may revolve relatively slowly, as compared to the usual drink mixer,— preferably between 500 and 5000 R. P. M.—and thus longer life is assured. This is because, among other things, the large diameter of the agitator gives a high peripheral speed despite a relatively low number of revolutions per minute.

While these specific embodiments of the invention have been described, it is contemplated that many changes and substitutions may be made without departing from the scope or spirit of the invention.

We claim:

1. A mixer for a liquid-and-ice cream beverage comprising a standard, an electric motor mounted at the upper end thereof, a vertically journaled agitator shaft driven by the motor and depending therefrom, a circular agitator generally horizontally disposed and carried at the lower end of the shaft and formed propellerwise for comminuting ice cream engaged thereby, a cup for receiving the ingredients of the beverage, a carriage vertically slidable on the standard, a platform on the carriage for receiving the cup, a controlling switch for the motor, means controlled by the elevation of the carriage beyond a predetermined level for closing the switch to operate the motor and agitator, the cup being of but slightly greater internal diameter than the agitator whereby the solid ice cream is substantially precluded from by-passing around the agitator when the agitator is adjacent the bottom of the cup, a lip on the carriage for embracing the upper edge of the cup to prevent outward displacement thereof, and resiliently mounted means on the platform for urging the cup upwardly into engagement with the lip, the carriage being free for upward movement under direct manual engagement of the cup to bring the agitator toward the bottom of the cup.

2. A mixer for a liquid-and-ice cream beverage comprising a standard, an electric motor mounted at the upper end thereof, a vertically journaled agitator shaft driven by the motor and depending therefrom, a circular agitator generally horizontally disposed and carried at the lower end of the shaft and formed propellerwise for de-solidifying ice cream engaged thereby, a cup for receiving the ingredients of the beverage, a carriage vertically slidable on the standard, a platform on the carriage for receiving the cup, a controlling switch for the motor, means controlled by the elevation of the carriage beyond a predetermined level for closing the switch to operate the motor and agitator, the cup being of but slightly greater internal diameter than the agitator whereby the solid ice cream is substantially precluded from by-passing around the agitator, a lip on the carriage for embracing the upper edge of the cup to prevent outward displacement thereof, and resiliently mounted means on the platform for urging the cup upwardly into engagement with the lip, the interior of the cup, adjacent the top, being outwardly flared to provide clearance for the agitator of the overhanging portion of the lip.

3. A drink mixer comprising a cup for receiving the ingredients including a ball of ice cream, an ice cream desolidifying rotary agitator, means journaling the agitator and positioning the cup for relative axial movement whereby the rotating agitator traverses the contents of the cup, the lower portion of the cup being cylindrical and the upper portion flaring upwardly therefrom to a polygonal upper edge, the agitator, when in the lower portion, extending outwardly substantially to the wall thereof for preventing substantial by-passing of ice cream around the agitator, the upper portion of the cup providing clearance for by-passing of ice cream around the agitator when the agitator is in the upper portion.

4. A drink mixer comprising a cup for receiving the ingredients including liquid ingredients and a ball of ice cream, an ice cream de-solidifying rotary dual agitator, means journalling the agitator and positioning the cup for relative axial movement whereby the rotating agitator traverses the contents of the cup, the dual agitator comprising a lower wagon wheel shaped member and an upper propeller member of considerably lesser diameter at a spaced distance thereabove, the rim of the lower member coming sufficiently close to the wall of the cup, when it is in the lower portion thereof, to prevent substantial by-passing of the ice cream around the lower member.

LOUIS D. JONES,
*Administrator of the Estate of Russell A. Blish, Deceased.*

HARRY D. RENCH.